United States Patent
Kirson et al.

[11] Patent Number: 6,114,970
[45] Date of Patent: Sep. 5, 2000

[54] METHOD OF ASSIGNING A DEVICE IDENTIFICATION

[75] Inventors: Allan M. Kirson, Highland Park; Brian G. Lucas, Barrington, both of Ill.

[73] Assignee: Motorola, Inc.

[21] Appl. No.: 08/780,976

[22] Filed: Jan. 9, 1997

[51] Int. Cl.[7] .................................................. H04Q 5/22
[52] U.S. Cl. .......................... 340/825.52; 340/825.07; 379/350; 370/383
[58] Field of Search ................. 379/350; 340/825.07, 340/825.06, 825.52, 825.53, 825.21; 360/49; 370/383, 409, 458, 406; 395/829, 823; 711/200, 212, 214, 220, 117; 1/1; 341/51; 707/100; 180/313

[56] References Cited

U.S. PATENT DOCUMENTS

| | | | |
|---|---|---|---|
| 4,755,792 | 7/1988 | Pezzolo et al. | 340/825.06 X |
| 5,107,256 | 4/1992 | Ueno et al. | 340/825.52 |
| 5,168,272 | 12/1992 | Akashi et al. | 340/825.06 X |
| 5,280,281 | 1/1994 | Shimotsuma et al. | 340/825.52 X |
| 5,305,355 | 4/1994 | Go et al. | 340/825.21 X |
| 5,343,472 | 8/1994 | Michihira et al. | 370/458 X |
| 5,351,041 | 9/1994 | Ikata et al. | 340/825.06 X |
| 5,535,336 | 7/1996 | Smith et al. | 340/825.07 X |
| 5,537,392 | 7/1996 | Wille et al. | 370/406 X |
| 5,592,667 | 1/1997 | Bugajski | 341/51 X |
| 5,799,308 | 8/1998 | Dixon | 707/100 |

*Primary Examiner*—Michael Horabik
*Assistant Examiner*—Anthony A. Asongwed
*Attorney, Agent, or Firm*—Michael J. Smith; Nicholas C. Hopman

[57] ABSTRACT

The present invention provides a method of assigning a unique device identification to an electronic device coupled into a communication architecture. Once coupled into the communication architecture a piece of globally unique identifying data is retrieved and utilized to generate a device identification which identification is then assigned to the device.

8 Claims, 3 Drawing Sheets

METHOD OF ASSIGNING A DEVICE IDENTIFICATION

FIELD OF THE INVENTION

The present invention relates generally to systems having inter-device communication and more particularly to a method of assigning device identifications to devices within the system.

BACKGROUND OF THE INVENTION

Communications technology continues to develop at geometric rates. Traditional communication devices are being designed with intelligence and processing capability for enhanced functionality while many new types of devices are being introduced. Moreover, communication technology is finding its way into nearly every aspect of life. For example, cellular telephone communication is now common place in motor vehicles as is digital data communication. Personal communication technology will allow individuals to constantly remain in touch no matter where they are located.

A common denominator to communications technology is being able to identify the devices between which the communication is to take place. For example, when one makes a telephone call, the calling telephone has an associated telephone number as does the called telephone. This information is maintained within the telephone system in the form of country codes, area codes and telephone number. In a computer network architecture devices, such as terminals, printers, modems, and the like, are coupled to the network and/or to other devices. These devices are programmed with unique addresses such that the network controller and/or the devices themselves may route data to and from a particular device. It is readily apparent that confusion would exist if two persons could have the same telephone number, or if more than one device on a computer network could have the same address.

A very common form of architecture has a number of devices connected to a multiplexed bus structure. Each device on the bus has a unique address and information is directed to the particular device on the bus by referencing the address utilizing any one of a number of communication protocols. One problem introduced by the evolution of communication technology is interchangeablity of devices between computer networks, communications systems, etc. When a device is moved from one system to the next it must be assigned an identification to reference it in the communication system. It goes without saying that this identification must be unique with respect to any other device operating in the system. In the global sense of, for example, the internet this address must uniquely identify the device from every other device communicating on the internet.

Motor vehicles have seen an explosion of in-vehicle electronics many of which relate to communications technology. For example, many of the electronics provide the driver and occupants with a vast amounts of data and information communicated to the vehicle via wireless methods. For example, advanced on-board navigation systems, phones and pagers, on-line weather information, diagnostic systems, electronic mail are being adapted for use in the vehicle. However, since the design and life cycles for an automobile are relatively long as compared to the design cycle for new electronic devices, new state-of-the-art electronic products are available but are not readily adaptable to the motor vehicle.

Modem motor vehicles are designed with an original equipment manufacturer (OEM) bus structure which allows the original equipment (OE) electronic devices to communicate with each other and with controllers. This bus structure, however, typically operates under a proprietary communication protocol. The OE devices connected to the bus are typically engineered or specified by the automobile manufacture such that they are completely compatible with the proprietary protocol. However, since each manufacturer will have its own protocol, and there presently does not exist an interconnection standard for secondary electronic devices, i.e., those which are typically available as after-market equipment, such devices are not readily adaptable to the OEM bus structure. In addition, many manufacturers restrict the ability to add devices to the OEM bus even if designed to be compatible. Hence, one will readily appreciate that while numerous state-of-the-art electronic devices are being introduced into the market place, many such devices are not readily adaptable for use within the motor vehicle.

A proposed solution to the foregoing problem is the introduction of the intelligent transportation systems (ITS) bus architecture. The ITS bus architecture provides a second in-vehicle bus which is coupled, such as by a gateway, to the proprietary OEM bus. The communication protocol on the ITS bus is a defined industry-wide standard with the gateway providing the interface to the OEM bus. The ITS bus allows the addition of state-of-the art electronics devices to motor vehicles without particularly adapting the electronic devices to the OEM bus.

With a solution to the addition of the electronic devices to the motor vehicle, there remains the problem with providing device identifications. In fact, the ITS bus allows easy interchangeability of devices between vehicles and to that extent exacerbates the device identification problem. Electronic devices will not necessarily be associated with any one particular vehicle. When interchanged from one vehicle to another, the device needs to be assigned a new identification. Hence, there remains a need for a method of assigning a unique device identification to electronic devices coupled into communication systems such as within motor vehicles.

DETAILED DESCRIPTION OF THE PREFERRED EMBODIMENTS

The present invention provides a method of assigning a unique device identification to an electronic device coupled into a communication architecture. Once coupled into the communication architecture a piece of globally unique identifying data is retrieved and utilized to generate a device identification which identification is then assigned to the device. While the invention is described in terms of preferred embodiments, one of ordinary skill in the art will readily appreciate its broad application extends far beyond the examples discussed herein.

Figure 1:
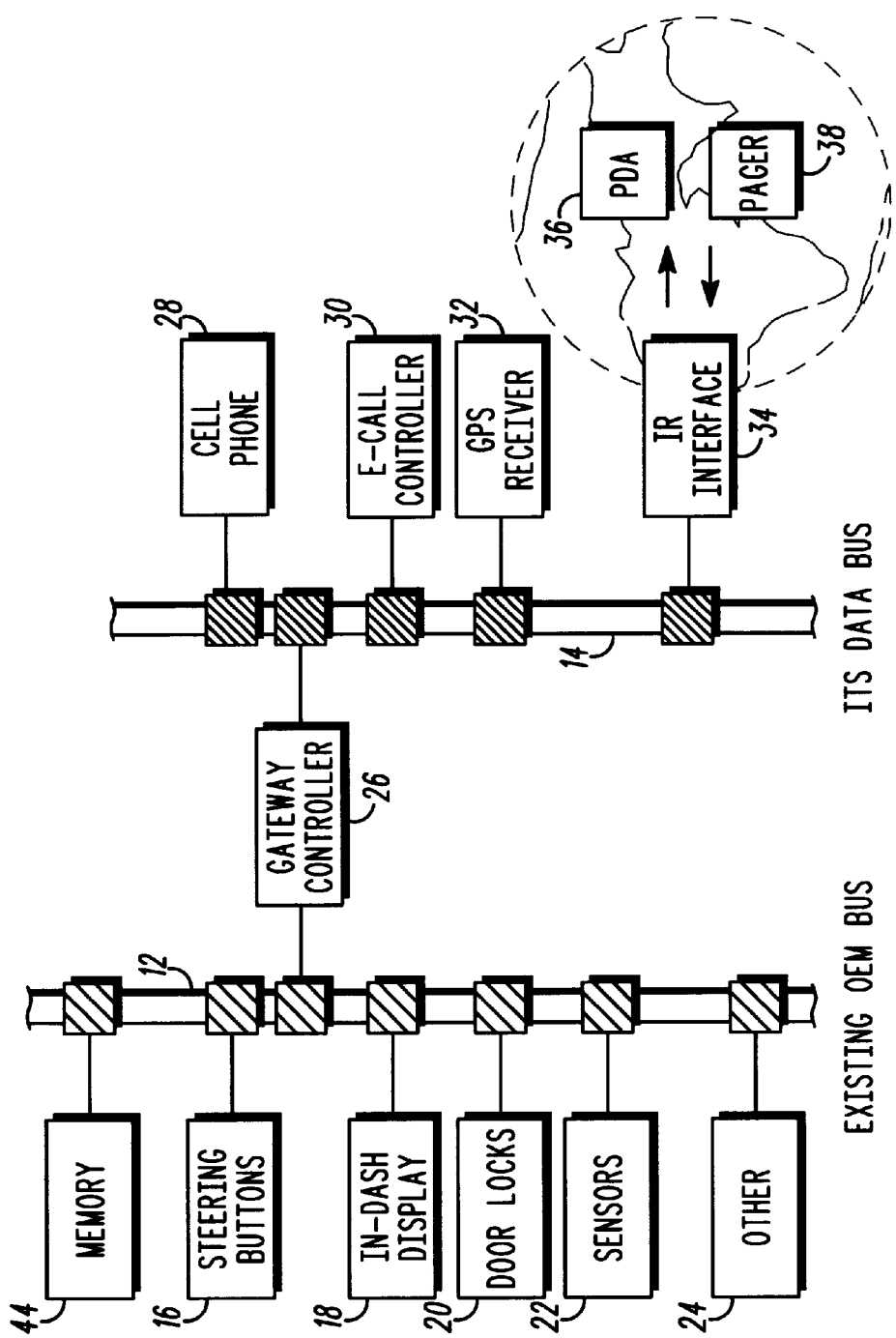
FIG. 1 is a schematic illustration of a typical motor vehicle OEM bus architecture coupled with an ITS bus architecture.

With reference to FIG. 1, a typical in-vehicle electronic system architecture 10 includes OEM bus 12 and ITS bus 14 structures. Coupled to OEM bus 12 are typical vehicle systems such as steering wheel controls 16, in-dash display 18, door lock system 20, vehicle sensors 22 and numerous other vehicle systems illustrated generally 24. OEM bus 12 is coupled via gateway 26 to ITS bus 14 in a manner which is well known in the art. Coupled to ITS bus 14 are numerous additional electronic devices such as cell phone 28, electronic call controller 30, navigation system 32 and infra-red (IR) interface device 34 for coupling to, for example, personal digital assistant (PDA) device 36 or pager 38. Preferably the devices are coupled in a peer-to-peer arrangement and the bus operates without a separate bus controller, and each of the devices contain memory for retaining various operating information including a device identification.

Figure 2:
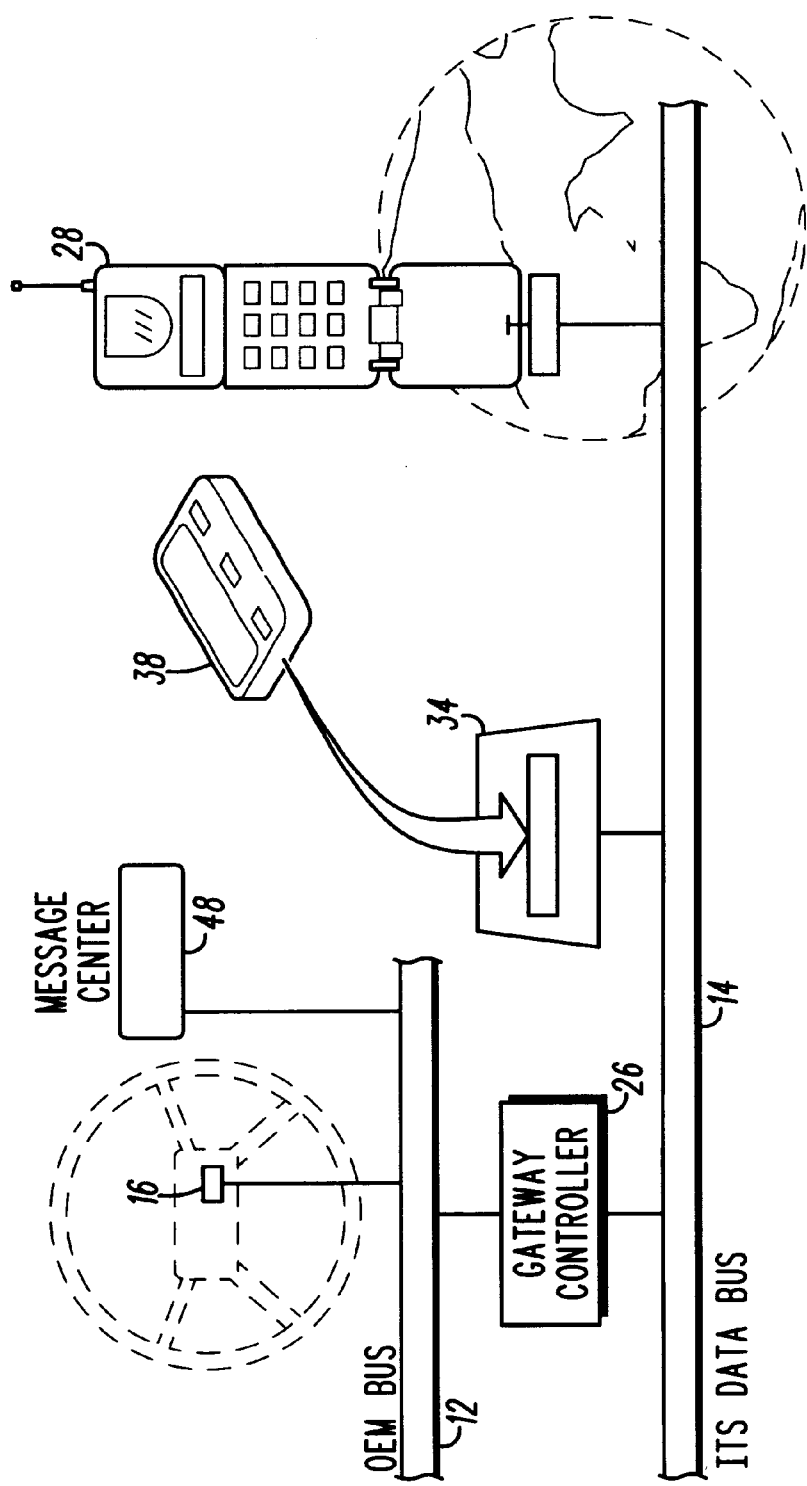
FIG. 2 is schematic illustration of a typical application of the ITS and OEM bus structures of FIG. 1.

An application and the advantages of ITS bus structure 14 is illustrated in FIG. 2. In FIG. 2, state-of-the-art cell phone 28 and pager 38 are coupled to ITS bus 14. The motor vehicle is further adapted with an in-vehicle message system 48 coupled to OEM bus 12. In this arrangement, pages to the vehicle driver may be displayed via ITS bus 14, gateway 26 and OEM bus 12 on message system 48 and by actuating a steering wheel control 16 the page information, i.e., a phone number, may be transferred to cell phone 28 and a call placed. All of this may be accomplished without the vehicle driver having to reach for and read the pager 38 or activate cell phone 28.

As will be appreciated, however, if pager 38 or cell phone 28 are not uniquely identified on ITS bus 14 the devices will not be uniquely addressable. That is, data from pager 38 could not be sent to message system 48 and in response to a steering wheel control 16 input be be sent to cell phone 28 for placing calls.

The present invention recognizes that within the vehicle there exists globally unique identification information data. In the preferred embodiment this data is in the form of the vehicle identification number (VIN) which is a multi-character alphanumeric sequence. It is known that every modern motor vehicle, through international standards, is assigned a unique VIN. In the most modem vehicles, this data is retained in a memory device, such as memory 44, associated with the vehicle. In accordance with a preferred embodiment of the present invention, when a new electronic device is coupled to ITS bus 14, the device preferably queries vehicle memory 44 to retrieve the electronic VIN and then uses this data to generate a unique device identification or address. This information may then be stored within memory associated with the device or within memory 44. It will be readily appreciated that any method of generating an identification using the electronic VIN may be employed, such as concatenation of the VIN with a device identification stored within the memory associated with the device, to generate the unique device identification. The method of the present invention has the distinct advantage of assuring that the device identification is in fact unique. Other techniques of using, for example, a pseudo random number, do not guarantee that the device identification is globally unique since pseudo random numbers can be duplicated. As communication technology expands and fully integrated communication systems are implemented, it will become vitally important that devices communicating within such systems are uniquely identified. The VIN number is globally unique with respect to any other identifier and when used in association with a device identification assures that the generated device identification is also globally unique.

Figure 3:
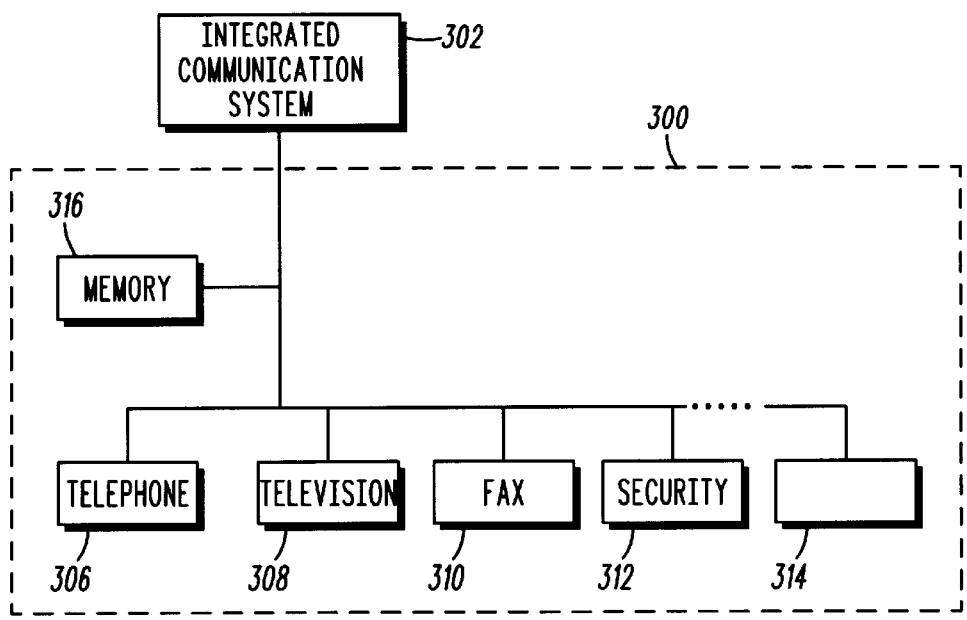
FIG. 3 is a schematic illustration of a number of electronic devices coupled to a in-home communication architecture.

With reference to FIG. 3, an alternate embodiment of the present invention is shown in association with an in-home communication system 300. As can be seen from FIG. 3, an in-home bus structure 318 is coupled to integrated communication system 302. It will be appreciated that integrated communication system 302 may be the existing telephone communication system, the evolving personal communication system, cable communication systems, and still others that may be introduced which will provide telephone, video, data and other forms of communication into a home. Within the home, numerous electronic devices, such as a telephone 306, television 308, facsimile machine 310, security system 312 and numerous others, such as personal computers, infra-red interface devices for adapting PDAs and/or paging devices, generally indicated 314 are coupled to in-home bus structure 318.

As will be appreciated, for information to be communicated to the proper in-home device, such as a telephone call from telephone 306 to television 308 for answering or alerts to and from security system 312 from and to telephone 306, each of these devices must have a globally unique address on the in-home bus structure 318. In accordance with a preferred embodiment of the present invention, when a new electronic device is coupled to in-home bus 318, the device retrieves a piece of globally unique identifying data. In the preferred embodiment, this may be a home phone number stored in memory contained in integrated communication system 302 or within memory 316. A home phone number, by country code, area or zone code, and number globally, uniquely identifies the call termination point within integrated communication system 302. This data is then used, in association with device identifying data, to generate a globally specific device identification for the device on the in-home bus 318. The globally specific device identification may then be stored in memory associated with the device, within memory 316 or within memory associated with the integrated communication system 302. In this manner, any number of devices may be interchanged or added to the in-home communication system and globally, uniquely identified on the in-home bus 318.

While the present invention has been described in terms of a number of preferred embodiments it will be readily appreciated that it has application beyond these several examples. The invention, therefore is not limited to the foregoing examples, but is as set forth in the subjoined claims.

We claim:

1. In a motor vehicle with a memory, the motor vehicle being identified by a unique vehicle identification number in the memory, a method of assigning a device identification to each of a plurality of electronic devices coupled to a communication architecture within the motor vehicle, the method comprising the steps of:

obtaining the vehicle identification number;

generating a device identification for each electronic device associated within the motor vehicle based upon the vehicle identification number; and storing the device identification within at least one of the memory and the associated electronic device itself.

2. The method of claim 1 wherein the step of generating a device identification comprises concatenating the vehicle identification number with a device identification number.

3. The method of claim 1 wherein the obtaining step includes one of the plurality of electronic devices retrieving the vehicle identification number from the memory through the communication bus, and wherein the generating step includes the one of the plurality of electronic devices generating the device identification, and wherein the storing step includes the storing the device identification within the associated one of the plurality of electronic devices.

4. The method of claim 1 wherein the communication architecture comprises a vehicle systems bus and a peripheral systems bus, the vehicle systems bus and the peripheral systems bus being coupled.

5. The method of claim 4 wherein the plurality of electronic devices is coupled to the peripheral systems bus.

6. The method of claim 1 wherein the vehicle identification number is a multi-character alphanumeric sequence.

7. The method of claim 1 wherein the the step of obtaining the vehicle identification number comprises obtaining the vehicle identification number from the memory.

8. The method of claim 7 further comprising the steps of:
associating an additional device with the motor vehicle,
obtaining the vehicle identification number from the memory, and
generating a device identification for the additional device based upon the vehicle identification number.

* * * * *